C. V. GUSTIN.
AUTOMOBILE LOCK.
APPLICATION FILED DEC. 6, 1917.
1,318,991. Patented Oct. 14, 1919.
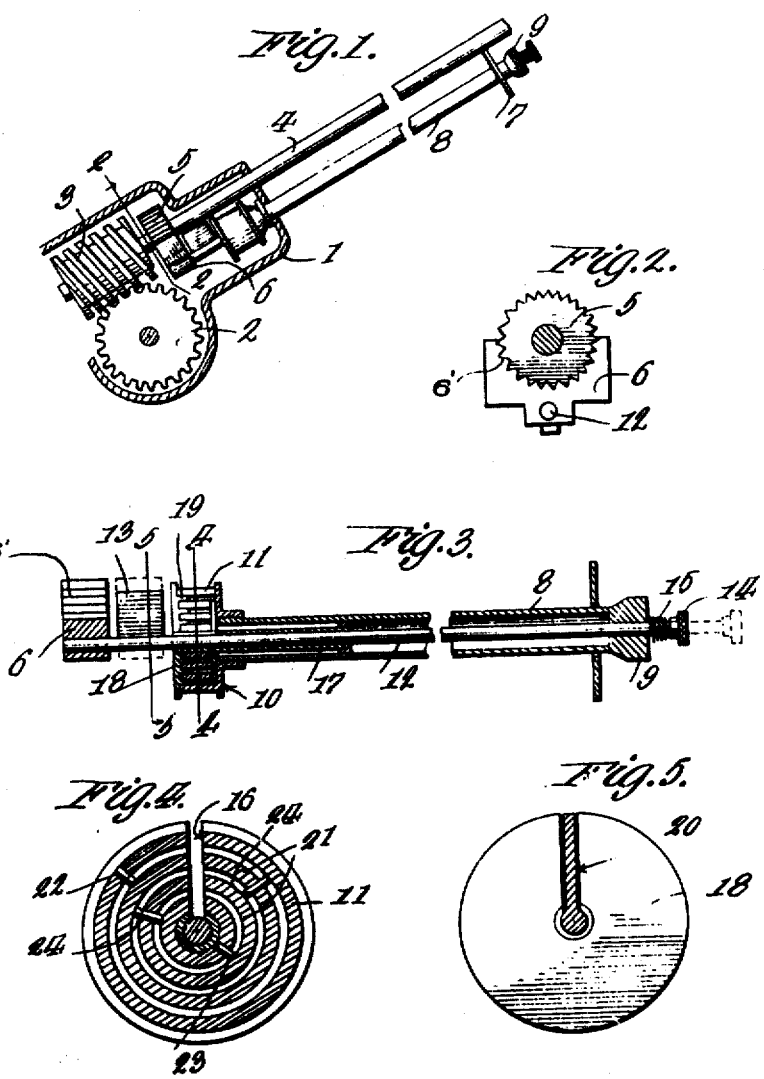

UNITED STATES PATENT OFFICE.

CLYDE V. GUSTIN, OF MONETT, MISSOURI.

AUTOMOBILE-LOCK.

1,318,991.

Specification of Letters Patent.  Patented Oct. 14, 1919.

Application filed December 6, 1917. Serial No. 205,833.

*To all whom it may concern:*

Be it known that I, CLYDE V. GUSTIN, a citizen of the United States, residing at Monett, in the county of Barry and State of Missouri, have invented certain new and useful Improvements in Automobile-Locks, of which the following is a specification.

This invention relates to a locking device for a steering gear of an automobile or other vehicle and has for its object the production of a simple and efficient means for locking the steering shaft of a vehicle in such a manner as to prevent the vehicle from being moved to any great distance without first releasing the steering shaft.

With the above and other objects in view this invention consists of certain novel constructions, combinations and arrangements of parts as will be hereinafter fully described and claimed.

In the drawings:—

Figure 1 is a side elevation of the locking device, the supporting casing being shown in section.

Fig. 2 is a section taken on line 2—2 of Fig. 1, the supporting casing being removed therefrom.

Fig. 3 is a longitudinal sectional view through the locking device.

Fig. 4 is a section taken on line 4—4 of Fig. 3.

Fig. 5 is a section taken on line 5—5 of Fig. 3.

By referring to the drawings, it will be seen that 1 designates the supporting casing which carries the usual steering worm wheel or gear 2, the usual worm screw 3 meshing therewith and being carried by the steering shaft 4. This steering shaft 4 carries a gear 5 adjacent the worm screw 3 and this gear 5 is adapted to be engaged by means of a locking plate or head 6 for holding the shaft 4 against rotation. This locking head comprises a body having teeth 6' formed upon the concave face thereof as shown in Fig. 2, these teeth 6' being adapted to mesh with the spur teeth formed upon the gear 5. In this way the gear 5 may be firmly locked in a set position when in engagement with the teeth 6' formed upon the head 6.

A dial plate 7 is supported in any suitable manner adjacent the steering shaft 4 and constitutes a supporting means for the permutation operating shaft 8. This shaft 8 carries a milled nut 9 at its upper end for the purpose of permitting the shaft 8 to be easily rotated, and suitable markings or indicating means may be carried by the dial 7 and the nut 9 for the purpose of permitting the operator to easily determine the amount of turn or rotation which has been given the shaft 8.

A top plate 10 is secured to the lower end of the tube 8 and an outer permutation ring 11 is secured to this top plate 10.

A locking rod 12 extends through the shaft or tube 8 and is secured at its lower end to the locking plate or head 6 and constitutes a support for this head 6. A blade or tongue 13 is carried by the rod 12 and is adapted to hold the rod 12 in a downwardly extending position for maintaining the head 6 in engagement with the ratchet or gear wheel 5. A knob 14 is carried by the rod 12 and a spring 15 is mounted upon the rod 12 and engages the outer face of the nut 9 for normally urging the rod 12 upwardly and also causing the blade or tongue 13 to extend through the notches 16 formed in the permutation rings hereinafter described.

An inner sleeve 17 is carried by the rod 12 and this inner sleeve 17 supports a bed plate 18. The bed plate 18 is provided with a plurality of short partitions 19 which fit between the respective permutation rings for holding the rings in proper relation. It of course should be understood that any suitable number of permutation rings may be employed and for the purpose of illustration, four of these rings are shown as set forth in Fig. 4 of the drawing. The bed plate 18 is provided with a notch 20 extending from one side thereof toward the center of the plate and notches 16 are formed in the permutation rings 21 and 11 adapted to register with the slot 20 when the rings are properly arranged.

The outer ring 11 is provided with an inwardly extending pin 22. The inner permutation ring is provided with an outwardly extending pin 23. The two intermediate rings are provided with transversely extending pins 24 projecting from both the inner and outer sides of the rings.

When it is desired to unlock the combination lock, presuming of course that the device is in a locked position, the nut 9 is rotated toward the left to the proper number until the notch formed in the inner ring registers with the notch 20 in the bed plate 18. The nut 9 is then rotated in the opposite direction toward the right for two complete revolutions and again continued to the proper number marked upon the dial for causing the notch formed in the second ring to register with the notch formed in the inner ring. The nut 9 is then rotated toward the left for one complete revolution and is then continued on in the same direction to a proper number on the dial for causing the third ring to assume its proper position for causing the notch formed in the third ring to register with the notches formed in the inner and second rings. The nut 9 is then again rotated in the opposite direction toward the right to the proper number upon the dial whereupon the notch formed in the outer ring will register with notches formed in the inner and two intermediate rings, thereby permitting the tongue 13 to freely move through the notches formed in the rings, which notches are now in registration with each other. As soon as the notches of all of the rings have been brought into alinement with the notch 20, the spring 15 will cause the blade 13 to be pushed upwardly through the notch 20 and the notches 16 in the permutation rings and in this manner the locking head 6 will be drawn out of engagement with the ratchet 5. Of course if it is again desired to lock the device, the steering shaft 4 may be rotated for the purpose of setting the front steering wheels at the desired angle and the rod 12 may be forced downwardly for causing the head 6 to engage the ratchet 5. It should be understood that as soon as the rings are properly arranged to permit the notches 16 to register, the spring 15 will cause the blades carried by the rod 12 to move within the notches 16 and thereby draw the locking heads 6 out of engagement with the ear 5. This rod 12 may be again reciprocated or moved downwardly to withdraw the blades 13 from the notches 16 by pressing downwardly upon the knobs 14. The nut 9 may then be rotated for causing the permutation rings to rotate and in this manner prevent the tongue 13 from moving upwardly.

It should be understood that the purpose of the present invention is to allow the steering wheels, or the front wheels of a vehicle to be set at an angle to the longitudinal axis of the vehicle and locked in this position for preventing the vehicle from being moved to any considerable distance. For instance the front wheels of a vehicle may be turned to extend in engagement with a curb and in this way prevent the movement of the vehicle in a path other than a circle until the steering shaft has been unlocked.

What is claimed is:—

In combination with a steering shaft provided with a spur gear formed thereon, a locking rod supported adjacent said steering shaft and extending longitudinally thereof, an enlarged locking head carried upon the lower end of said rod and provided with a substantially concave pocket upon the upper face thereof, said concave pocket provided with teeth formed upon the inner face thereof for registering with the teeth formed upon the spur gear carried by said steering shaft whereby said steering shaft will be locked against operation when engaged by said locking head, a laterally extending tongue carried by said rod above said locking head, and means coöperating with said locking tongue for holding the same against longitudinal movement and in a locked position.

In testimony whereof I affix my signature in presence of two witnesses.

CLYDE V. GUSTIN.

Witnesses:
WILLIAM SMERDON,
L. H. FERGUSON.